Oct. 22, 1968 D. P. GRUDOSKI 3,406,934
SAFETY FRAME FOR HOBBYHORSES AND OTHER
SUSPENDED SEATING DEVICES
Filed June 1, 1964 4 Sheets-Sheet 1

INVENTOR.
DANIEL P. GRUDOSKI
BY Ely, Pearne + Gordon
ATTORNEYS

Oct. 22, 1968  D. P. GRUDOSKI  3,406,934
SAFETY FRAME FOR HOBBYHORSES AND OTHER
SUSPENDED SEATING DEVICES
Filed June 1, 1964  4 Sheets-Sheet 2

INVENTOR.
DANIEL P. GRUDOSKI
BY Ely, Pearne & Gordon

ATTORNEYS

Oct. 22, 1968 D. P. GRUDOSKI 3,406,934
SAFETY FRAME FOR HOBBYHORSES AND OTHER
SUSPENDED SEATING DEVICES
Filed June 1, 1964 4 Sheets-Sheet 3

INVENTOR.
DANIEL P. GRUDOSKI
BY Ely, Pearne & Gordon
ATTORNEYS

United States Patent Office 3,406,934
Patented Oct. 22, 1968

3,406,934
SAFETY FRAME FOR HOBBYHORSES AND OTHER SUSPENDED SEATING DEVICES
Daniel P. Grudoski, Hartstown, Pa., assignor to Blazon, Inc., Akron, Ohio, a corporation of Ohio
Continuation-in-part of application Ser. No. 215,104, Aug. 6, 1962. This application June 1, 1964, Ser. No. 371,582
7 Claims. (Cl. 248—165)

This invention relates to a spring-suspended hobbyhorse, chair, or like seating device capable of providing a stable, durable, and safe suspension that is capable of providing lively bucking, pitching, and rearing movements for a hobbyhoarse, for example, or a comfortable rocking and swinging movement for a lawn chair, all as the user intends. More particularly, this invention relates to a frame for the suspension systems of such devices; it is adapted not only for the preferred hobbyhorse suspension system described hereafter in detail but for other suspension systems, including those consisting of springs alone.

This application is a continuation-in-part of my co-pending application, entitled, "Suspension System for Hobbyhorse and Other Seating Devices," Ser. No. 215,104, filed Aug. 6, 1962, Ser. No. 215,104, now U.S. Patent No. 3,135,510.

Heretofore, hobbyhorses have been constructed to simulate what a child imagines to be the movements of a real horse by employing springs and/or mechanical linkages in the suspending device. When mechanical linkages alone were employed, the hobbyhorse was relatively stable but the ride was not "lively" since the action of the horse was generally confined to a fixed path. When springs alone were employed, the hobbyhorse was suspended by connecting the springs directly to the body of the horse from the supporting base. Although the spring-suspended hobbyhorse permits a "lively" ride that simulates the movements of a horse, this liveliness sometimes transcends the stability of the structure. This is particularly true where a small child becomes overly active or excited while riding the hobbyhorse. The child in many instances will not be able to regain his balance after being pitched forwardly or rearwardly and may fall from the horse. Indeed, excess liveliness of a spring-suspended hobbyhorse may frighten small children who attempt to use it.

Further, the imminence of the usual sharp, upstanding parts of the base for the prior art suspension systems could, and for good cause, frighten both the child and any responsible adult who watched or visualized the child on a bucking, pitching, and rearing hobbyhorse. The upstanding members of a hobbyhorse frame usually were located in positions that would seriously injure a child if the springs failed or became detached from their mountings during a ride.

Additionally, the prior art bases for supporting the springs and linkages were usually constructed in such a way as to make access to the hobbyhorse extremely awkward or otherwise constitute a contraption in which the complex frame and suspension would destroy any intended illusion of a galloping horse (or at least appear to do so in the minds of adult purchasers).

It is the object of the present invention to provide a frame or base for a suspension system for hobbyhorses and like suspended seating devices which may be formed of metal tubing in sections which can be shipped compactly in knockdown form but readily assembled and, when assembled, provides a sturdy, geometrically stable structure which overcomes the foregoing objection to the bases heretofore employed by the prior art.

Specifically, it is an advantage of such a frame made according to this invention that a hobbyhorse may be suspended well above the floor from points outboard of the horse body, but without the heretofore upstanding posts or other projections which would be likely to injure a child if the child fell from the horse.

Another advantage of this invention is that it permits easy access to the horse while supporting it with a minimum of structural members so that, as far as the frame or base is concerned, it will not destroy the illusion of approching and mounting a riding horse.

Still another advantage of a frame or base made according to this invention is that it is adaptable to support a variety of suspension systems and may afford more flexibility to increase the liveliness of the ride. In one embodiment of a frame made according to this invention, such a live support for the horse may be provided while, at the same time, the tendency of the frame to "walk" as the hobbyhorse is being ridden is lessened.

The foregoing and numerous additional objects, features, and advantages of the invention will become apparent and more fully understood from the following detailed description of the invention and the accompanying drawings in which.

Figure 1:
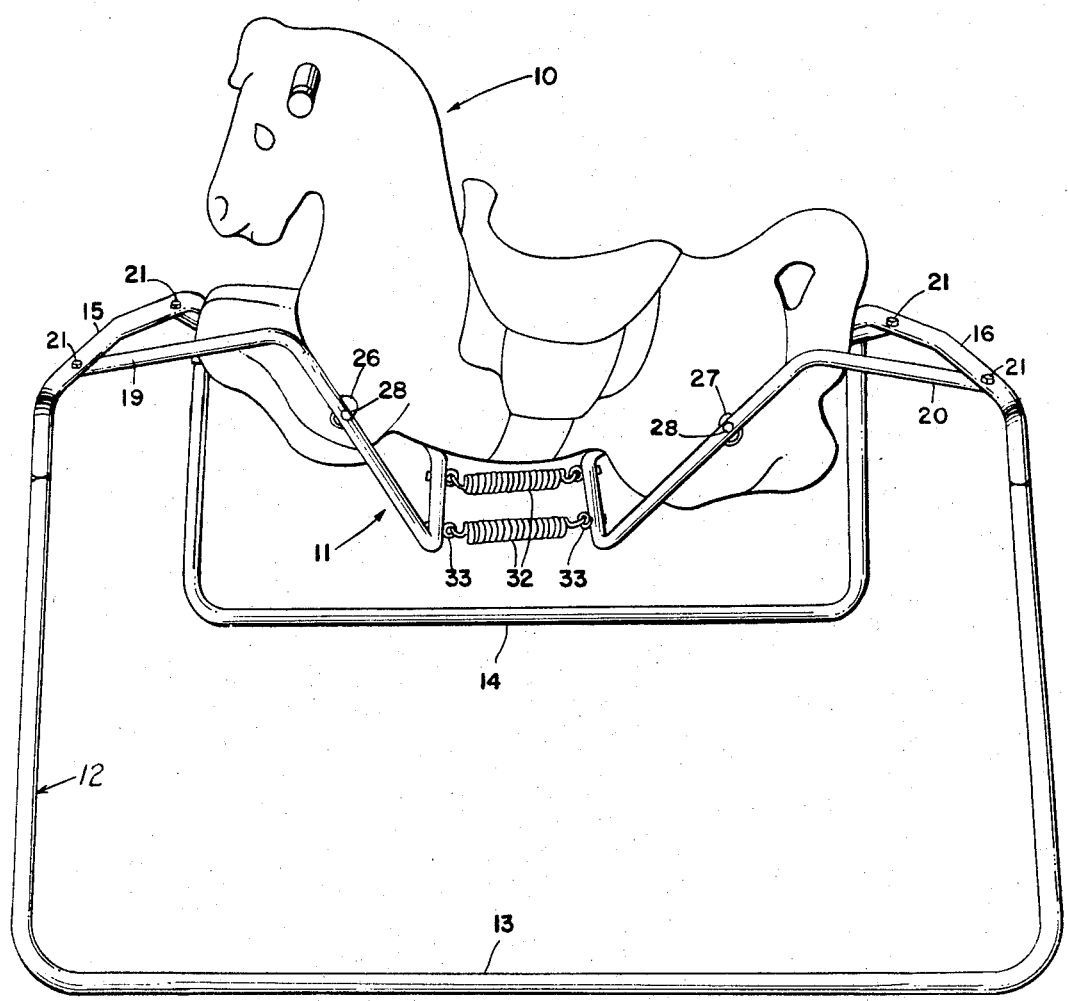
FIGURE 1 is a perspective view of a hobbyhorse supporting frame made according to this invention, looking at the hobbyhorse downwardly and from one side.
Figure 3:
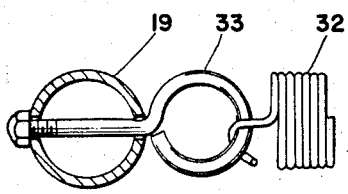
FIGURE 3 is a fragmentary sectional view showing in detail the connection of a spring to a linkage member of the suspension system shown in FIGS. 1 and 2.
Figure 2:
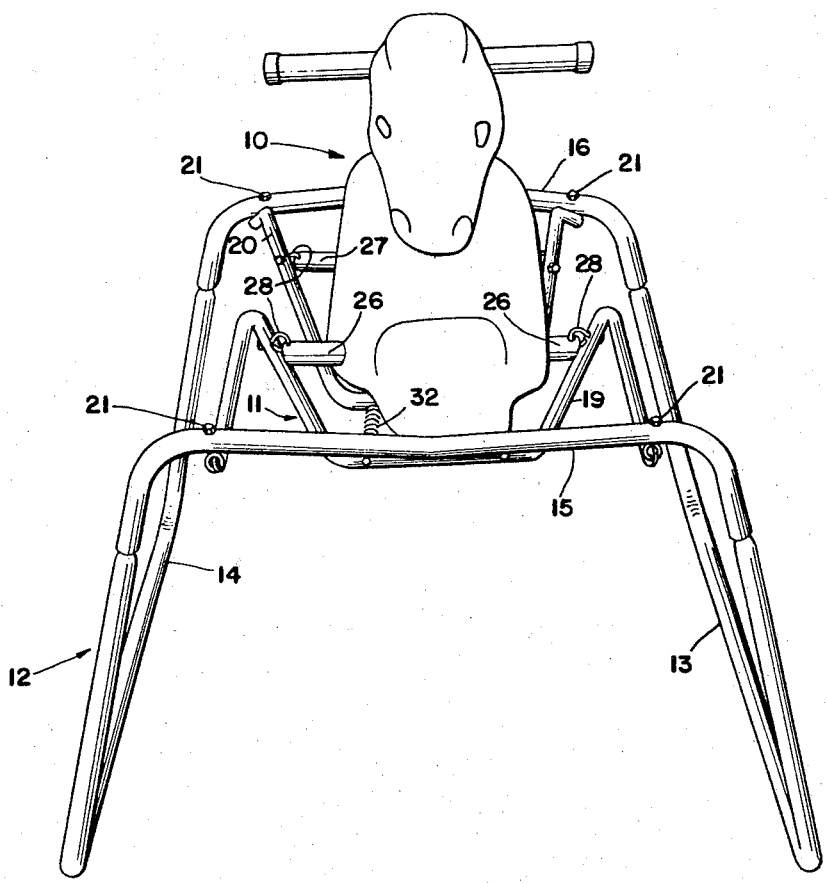
FIGURE 2 is another perspective view of the hobbyhorse and frame as shown in FIGURE 1, looking at the hobbyhorse downwardly and from the front.

Referring now to FIGURES 1 and 2 of the drawings, a hobbyhorse is illustrated which includes a body 10, a preferred suspension system 11, and a frame 12.

The frame 12 comprises a pair of U-shaped side support members 13 and 14 and a pair of front and rear inverted U-shaped top cross pieces 15 and 16, respectively. The members 13 and 14 and cross pieces 15 and 16 are preferably made from hollow metal tubing. The top cross piece 15 is telescoped over the upwardly extending front leg portions of the side support members 13 and 14 to connect them at the front of the frame 12; the top cross piece 16 is telescoped over the upwardly extending rear leg portions of the side support members 13 and 14. In the embodiment shown in FIGS. 1 and 2, the legs of the U-shaped supports 13 and 14 are slightly convergent and the legs of the cross pieces 15 and 16 are slightly divergent to provide a frame comprising a pair of parallel bottom bearing rails and a pair of transverse top pieces above the plane of the bottom rails connected together so as to constitute a single loop of tubing bent to provide four upwardly extending legs falling on the edges of a truncated pyramid. This provides, with the minimum number of linear elements, a support which is geometrically stable, in so far as it resists tipping from the rapidly shifting center of gravity of a child riding a hobbyhorse supported therein. Due to the elasticity of the preferred metal tubing, stressed under load at the bends, especially, of the U-shaped members, however, the frame not only serves as a support but cooperates to become an active element in a spring-suspension system which increases in geometric stability as it flexes under load. Thus, under load, the outward flexing of the legs of the inverted U's constituting the top pieces 15 and 16 broadens the base of the frame 12 and the inward flexing of the U's constituting the side support members 13 and 14 lowers the center of gravity of the hobbyhorse and child supported by the frame 12.

Figure 4:
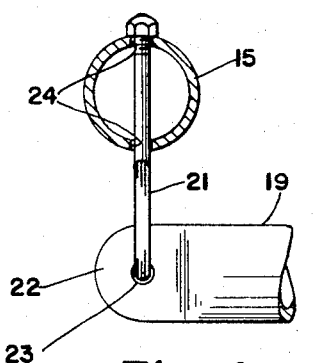
FIGURE 4 is a fragmentary sectional view showing a connection between the supporting frame and the suspension linkage in detail.
Figure 5:
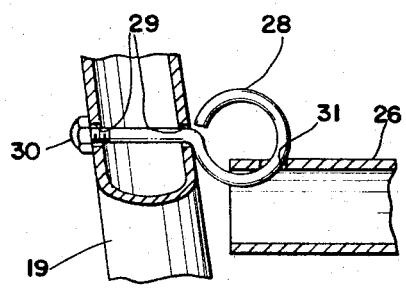
FIGURE 5 is a fragmentary sectional view showing in detail the connection between a suspension linkage member and the hobbyhorse of the suspension system shown in FIGS. 1 and 2.

It is to be noted that the tubing from which the frame 12 is formed is rather gently curved at the bends between the base and leg portions of the U-shaped members from which the frame is assembled, particularly in the top cross pieces 15 and 16. This avoids sharp projections upon which a child might be injured if it stumbled in mounting the hobbyhorse or fell while intentionally or unintentionally dismounting. It is also to be noted that the top cross pieces 15 and 16 are bent outwardly at their centers. This provides space for movement of the horse body 10 while also providing four areas adjacent the leg portions of the cross pieces from which the horse body may have outboard support; as by means of eye bolts 21 passing through holes 24 drilled in the cross pieces 15 and 16, as shown in detail in FIG. 4 with respect to one of the eye bolts 21 secured on the cross piece 15.

The suspension system, identified by the general reference numeral 11, which I prefer to support by the above described frame 12, is shown in identical FIGURES 1 to 5, inclusive, of my above identified copending application Ser. No. 215,104 and reference is made to the specification thereof for a detailed description of its construction and explanation of its operation. For purposes of this application, the suspension system 11 may be more summarily described as comprising a pair of U-shaped hangers 19 and 20 connected by means of the bolts 21 to the top frame cross pieces 15 and 16, respectively. The horse body 10 is provided with transverse support bars 26 and 27 pivotally connected to the hangers 19 and 20, respectively. Springs 32 connect adjacent base portions of the U-shaped hangers 19 and 20 to provide a resilient suspension for the horse body 10. As mentioned at the outset of this specification, however, other types of suspension systems may be advantageously used in a frame as described. Thus, for example, a suspension consisting of springs alone may be provided by one pair of springs, each extending from a bolt 21 in the cross piece 15 to an adjacent end of the transverse bar 26 and a second pair of springs, each extending from a bolt 21 in the cross piece 16 to an adjacent end of the transverse bar 27.

As indicated at the outset also, a frame for a suspension system made according to this invention is not limited to use for supporting hobbyhorses, but may be employed for other spring-suspended devices upon which a person may be seated and induce more sedate swinging and rocking movement. An example of such a modification is a lawn chair as shown in FIGURE 6.

Figure 6:
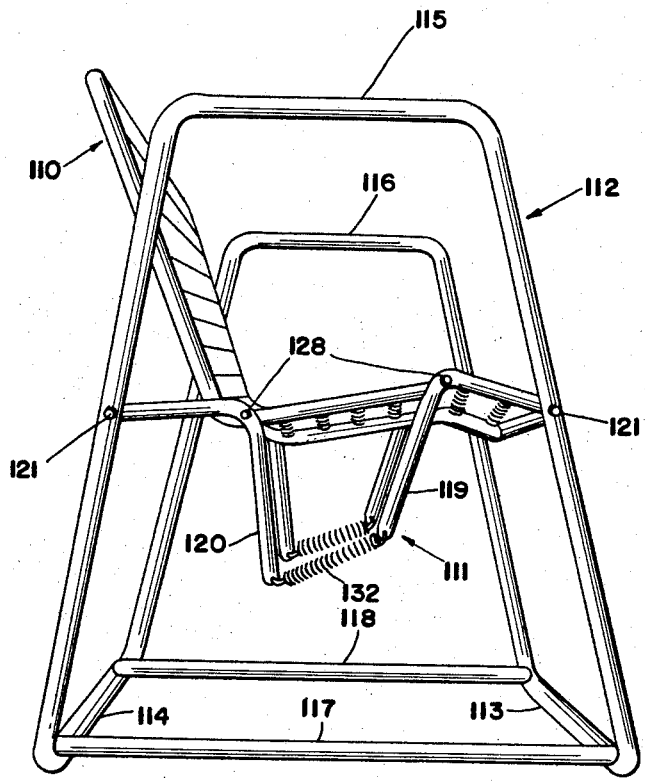
FIGURE 6 is a perspective view of a modification of a suspension in a frame made according to this invention showing its adaption to support a lawn chair, for example.

Referring to FIGURE 6, the lawn chair comprises a seat 110 having a back and deck formed in any suitable fashion, in the particular instance from bent tubular side members joined by slats, webbing, or the like to provide a seating surface. The seat 110 is supported by a suspension system of links and springs 111 (corresponding in principle to the system 11 employed for a hobbyhorse) and a frame 112.

The frame 112 is comprised of U-shaped bottom members 113 and 114, the bases of which provide parallel bearing rails for the framework. The legs of the bottom members 113 and 114 are connected by inverted U-shaped transverse cross pieces 115 and 116 which, in this instance, may also serve as arms for the chair. As evident, the leg of the inverted U-shaped cross pieces are divergent so that the assembled structure envelopes, in barest continuous outline, a three-dimensional solid, which is geometrically stable with respect to the center of gravity of the person supported within the framework. Since the lawn chair is intended for relatively sedate use, suitable braces 117 and 118 may be employed to increase the rigidity of the framework and minimize its function as an actively resilient element of the spring-suspension system.

Figure 7:
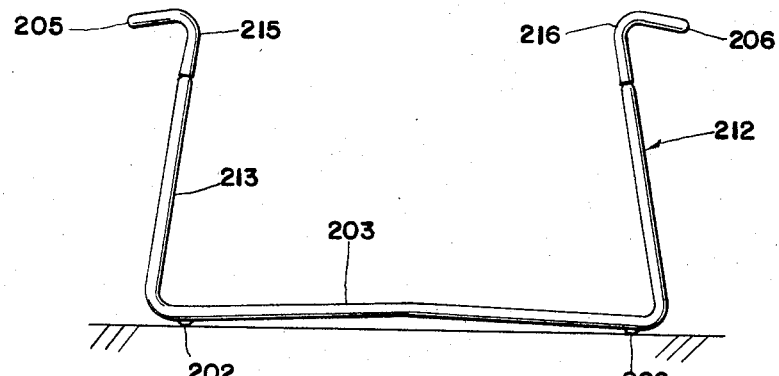
FIGURE 7 is a side elevation of a modified form of supporting frame made according to this invention.
Figure 8:
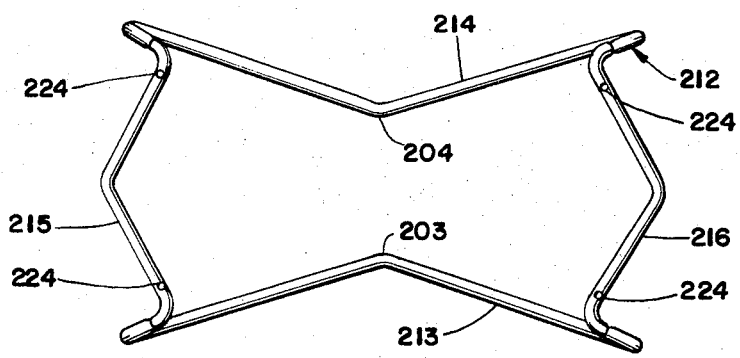
FIGURE 8 is a plan view of a frame as shown in FIG. 7.
Figure 9:
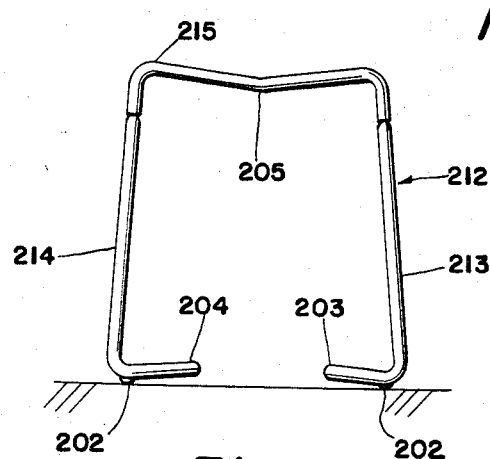
FIGURE 9 is a front elevation of the frame shown in FIGS. 7 and 8.

As in the case of the hobbyhorse shown in FIGURES 1 to 5, open access to the seating device suspended in the frame 112 shown in FIG. 6 is provided in a direction transverse to the parallel bottom rails of the framework 111 between the ends defined by the transverse upper cross pieces and the framework legs connecting the upper cross pieces to the bottom rails. It is to be understood, however, that the base portion of the U-shaped member providing the bottom rail need not be straight sections of tubing, but may be bent or curved to provide still easier access. Such a frame, which also tends to reduce any tendency of the suspended horse body or seating device to cause the frame to walk, is shown in FIGS. 7 to 9 as a frame 212 for supporting a hobbyhorse suspension system.

The frame 212 comprises a pair of generally U-shaped tubular side members 213 and 214 each having upstanding leg portions connected to corresponding leg portions of the other side members by means of inverted U-shaped cross pieces 215 and 216 telescoped over the ends of the upstanding leg portions. As in the case of the frames 12 and 112, the upstanding leg portions are preferably convergent so that they will fall on the edges of a truncated pyramid. Rather than the bottom rail portions of the side members 213 and 214 being straight, they are bent inwardly at their respective center portions 203 and 204, as shown in FIG. 8, so as to bring the center portions 203 and 204 more nearly under the belly of the horse body to be suspended in the frame 212. This minimizes the danger of a child's tripping over the bottom rail portions of the side members 213 and 214. With the central portions 203 and 204 so brought toward each other, the bottom rail portions of the members 213 and 214 can also be safely bent to raise the portions 203 and 204 slightly above the floor, indicated by the ground lines in FIGS. 7 and 9. With the central portions 203 and 204 so raised, the frame 212 will rest on the ground or floor adjacent the outside bottom corners of the frame as provided by the bends from the bottom rail portions to the upstanding leg portions of the members 213 and 214. It has been discovered that with the described configuration of the bottom rail portions, there is a lessened tendency of the frame 212 to "walk," even during relatively violent riding action on the hobbyhorse; at the same time the danger that a child might have a greater tendency to trip over the bottom rails in getting on or off the horse due to the raising of the central portions 203 and 204 is eliminated due to the positioning of these central portions beneath the horse body. Suitable pads or rubber buttons 202 may be attached at the bearing points to minimize marring the floor and aid in reducing "walking."

The top cross pieces 215 and 216 may be of a configuration similar to the cross pieces 15 and 16 of the frame 12 except that their central portions 205 and 206 are preferably bent slightly downwardly as well as outwardly. This has been found to slightly increase the space for movement of the horse body suspended by the more popular suspension systems. The top cross pieces 215 and 216 are usually drilled adjacent their outside corners to provide holes 224 for connecting a suspension system to the frame 212.

In the light of the above teachings, many other modifications and variations of the invention will become apparent to those skilled in the art. It is to be understood, therefore, that within the scope of the appended claims, the invention may be practiced otherwise than as specifically disclosed.

What is claimed is:

1. A frame for a resiliently supported seating device such as a hobbyhorse consisting essentially of a pair of tubular U-shaped bottom members, each having a bottom rail portion integral at its ends with a pair of upstanding leg portions, said bottom rail portions being resiliently spaced from each other by resilient connections constituting essentially the sole connections between said bottom members and consisting essentially of a pair of cross pieces, each having the general shape of an inverted U to provide a pair of downwardly depending leg portions, the pair of downwardly depending leg portions of each cross piece being connected to corresponding upstanding leg portions of each bottom member to provide a closed loop of tubing having four upstanding end corner portions; and means in each of said cross pieces adjacent each corner portion from which a seating device may be suspended.

2. A frame as defined in claim 1 in which the said U-shaped members are formed of hollow tubing and the connected leg portions thereof are telescopically connected.

3. A frame as defined in claim 2 in which the downwardly extending leg portions of each cross piece are integrally connected to the horizontal portion thereof by curved bends to provide upper corners of the said loop without sharp projections.

4. A frame as defined in claim 3 in which said bottom rail members are bent toward each other adjacent their central portions.

5. A frame as defined in claim 4 in which the central portions of said bottom rail members are bent upwardly from the outside bottom corners of said loop.

6. A frame for a resiliently supported seating device such as a hobbyhorse comprising a pair of spaced tubular U-shaped bottom members, each having a bottom supporting rail portion integral with a pair of upstanding leg portions; a pair of cross pieces each having the general shape of an inverted U to provide a pair of downwardly depending leg portions, the pair of downwardly depending portions of each cross piece being connected to corresponding upstanding leg portions of each bottom member to provide a closed loop of tubing having four upstanding corner portions and the central portion of said cross pieces being bent away from each other to provide a central space within which a hobbyhorse may move with respect to the outside corners of said loop; and means in each of said cross pieces from which a hobbyhorse may be suspended.

7. A frame as defined in claim 6 in which said central portion of said cross pieces are bent downwardly as well as outwardly.

References Cited

UNITED STATES PATENTS

| 2,668,579 | 2/1954 | Swengel | 272—52 |
| 3,050,302 | 8/1962 | Rassier | 272—52 |
| D. 158,703 | 5/1950 | Westcamp | 272—54 X |
| 2,758,632 | 8/1956 | Koller et al. | 272—52 X |
| 2,978,245 | 4/1961 | Rempel | 272—52 |
| 2,622,877 | 12/1952 | Lemponen | 272—52.5 |
| 2,756,051 | 7/1956 | Shone | 272—53.1 |

FOREIGN PATENTS

| 616,497 | 3/1961 | Canada. |
| 12,500 | 2/1925 | Netherlands. |

OTHER REFERENCES

"Popular Mechanics" magazine, January 1959, pp. 214 and 215.

ANTON O. OECHSLE, *Primary Examiner.*

A. W. KRAMER, *Assistant Examiner.*